United States Patent Office 3,600,393
Patented Aug. 17, 1971

3,600,393
DIALKYLAMINO ALKYLAMINO PYRAZOLO
[3,4b] QUINOLINES
Rolf Ernst Graeve, Milwaukee, Joseph Robert Pociask, Cudahy, and Robert George Stein, Wauwatosa, Wis., assignors to Aldrich Chemical Company, Inc., Milwaukee, Wis.
No Drawing. Filed Mar. 3, 1969, Ser. No. 803,952
Int. Cl. C07d 33/54
U.S. Cl. 260—286
9 Claims

ABSTRACT OF THE DISCLOSURE

Compounds of the formula

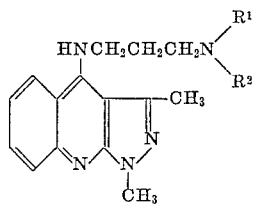

wherein $R^1$ and $R^2$ each represent (lower)alkyl; and the pharmaceutically acceptable nontoxic salts thereof exhibit hypocholesteremic and hypolipemic activity and are useful as hypocholesteremic and hypolipemic agents for lowering serum cholesterol and phospholipid levels in mammals.

BACKGROUND OF THE INVENTION (1) Field of the invention

This invention relates to novel compounds exhibiting hypocholesteremic and hypolipemic activity which are useful for lowering blood cholesterol and phospholipid levels in mammals. In another aspect this invention relates to a method of preparing the novel compounds.

(2) Description of the prior art

An object of the present invention is to provide novel compounds which would be of value as hypocholesteremic and hypolipemic agents in mammals. While some compounds having such activity are known in the art there is a need for additional agents having hypocholesteremic and hypolipemic activity. The compounds of this invention are prepared from a compound described in Belgian Patent No. 632,758 as being useful as an optical brightener.

SUMMARY OF THE INVENTION

There is provided according to the present invention compounds of the formula

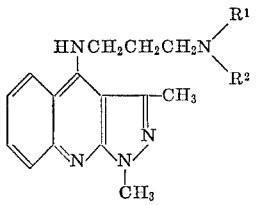

wherein $R^1$ and $R^2$ each represent (lower)alkyl; and the pharmaceutically acceptable nontoxic salts thereof.

DETAILED DESCRIPTION

The pharmaceutically acceptable nontoxic salts include the organic and inorganic acid addition salts, e.g., those prepared from acids such as hydrochloric, sulfuric, sulfonic, tartaric, fumaric, hydrobromic, hydroiodic, glycolic, citric, maleic, phosphoric, succinic, acetic and the like. Such salts are prepared by conventional methods by reacting the free base with the desired acid. The compounds of this invention contain three basic, salt forming groups and can therefore combine with an acid to form a salt containing one, two or three molecules or fractions thereof of the acid.

The term "(lower)alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

A preferred embodiment of the present invention consists of the free base of the formula

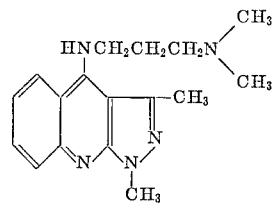

and the pharmaceutically acceptable nontoxic salts thereof.

The compounds of this invention are prepared as exemplified below by reacting 4-chloro-1,3-dimethyl-1H-pyrazolo[3,4-b]quinoline of the formula

III

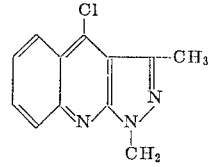

with an amine of the formula

IV

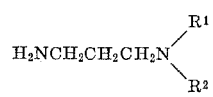

wherein $R^1$ and $R^2$ are as described below. This reaction is conveniently carried out in the presence of a nonreactive solvent and at elevated temperatures. Suitable solvents include phenol, benzene, etc. Preferably the reaction is carried out at from about 100 to 200° C. However neither solvent nor temperature employed is critical. The resulting product is readily recovered as exemplified below by conventional procedures.

The starting material 4 - chloro-1,3-dimethyl-1H-pyrazolo[3,4-b]quinoline (Formula III) is described in Belgian Pat. No. 632,758 and is prepared as exemplified below in Examples 1, 2 and 3. The reaction scheme is as follows:

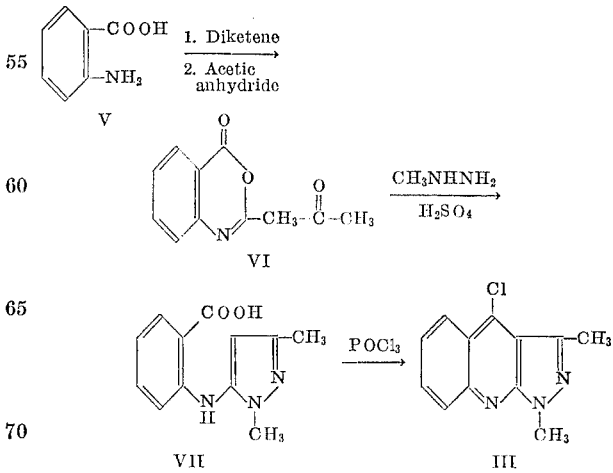

The compounds of this invention have a high degree of hypocholesterolemic and hypolipemic activity, making them potent hypocholesterolemic and hypolipemic agents and are useful for lowering serum cholesterol and phospholipid levels in mammals. Additionally the compounds do not produce accumulation of cholesterol, desmosterol or 7-dehydrocholesterol in the liver.

Hypocholesterolemic and hypolipemic tests of the compounds of the present invention were carried out by administering the compounds (suspended in 0.5% carboxymethyl cellulose solution) at a dose of 400 mg./kg. p.o. to rats once daily for 4 days. The control rats were tested similarly with the same volume dose of 0.5% carboxymethyl cellulose only. Starting the evening of the fourth day, the rats were fasted. On the fifth day, the serum of the treated rats and control rats was analyzed for cholesterol and phospholipids and the cholesterol and phospholipids compared. The results are expressed as the percentage decrease in serum cholesterol and phospholipids.

In the test described above, a preferred compound of the present invention having the formula

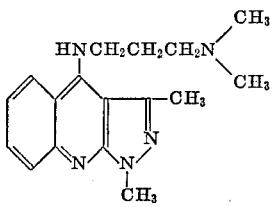

gave the following percentage decrease in serum cholesterol and phospholipids.

| Oral dose (mg./kg.) | Serum (percent) | |
|---|---|---|
| | Cholesterol | Phospholipids |
| 400 | −51 | −47 |
| 200 | −26 | −23 |
| 100 | −25 | −9 |

No accumulation of cholesterol, desmosterol or 7-dehydrocholesterol was found in the liver of the test animals.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The composition may take the form of tablets, powders, granules, capsules, suspensions, solutions and the like.

The compounds of this invention when administered orally or parenterally in a cholesterol or phospholipid lowering amount are effective in lowering serum cholesterol and phospholipid levels in mammals. An oral dosage range of about 100 to about 400 milligrams per kilogram of body weight per day is convenient for lowering serum chloesterol and phospholipid levels in mammals, which may be administered in divided dosage, e.g., two, three or four times a day. Administration of the compounds is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of serum cholesterol and phospholipids lowering effect required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

2-acetylbenzoxazinone

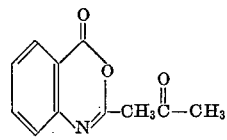

The anthranilic acid used was dried for 24 hours, in vacuo. The dry anthranilic acid (480 g., 3.5 mol.) was suspended in hot carbon tetrachloride (8 l.) in a 12-1 flask. Freshly distilled diketene (320 g., 3.8 mol.) was added, over 2.5 hours, to the stirred suspension. This mixture was refluxed for 3.5 hours and left to cool. Acetic anhydride (430 g., 4.2 ml.) was added slowly, and refluxing was recommenced for 15 hours. The hot solution was filtered. Upon cooling, crystals formed in the filtrate, which were filtered, washed with petroleum ether, and airdried. The remaining solution was evaporated, in vacuo, and the residue was recrystallized from carbon tetrachloride.

Yield: 540 g., 2.66 ml. (76.0% of theory), M.P. 116–121° C. (U.S. 3,257,410; M.P. 121–122° C.).

EXAMPLE 2

N-(1,3-dimethyl-5-pyrazoyl)anthranilic acid

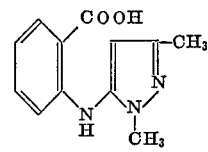

Methylhydrazine (246 g., 5.32 mol.) was added to a solution of sulfuric acid (522 g., 5.32 mol.) in water (8 l.); the pH was then adjusted to neutrality with excess methylhydrazine. Then 2-acetylbenzoxazine, (1079.9 g., 5.32 mol.) was added with efficient stirring over the course of 6 hours. (Efficient stirring is essential because of foaming. A large, open reaction vessel is also helpful.) This mixture was stirred for 2.5 hours. During addition and stirring, the pH was maintained between 6 and 7 by periodical addition of a 20% sodium carbonate solution. After stirring, the mixture was made basic (ca. pH=8) with additional 20% sodium carbonate solution, and the resulting reddish-brown solution was filtered and acidified (pH=6.0) with hydrochloric acid. The resulting yellowish precipitate was filtered, washed with water, airdried, and recrystallized from ethanol.

Yield: 799.5 g., 3.46 mol. (65.0% of theory); M.P. 202–207° C. (U.S. 3,257,410; M.P. 212–213° C.).

EXAMPLE 3

4-chloro-1,3-dimethyl-1H-pyrazolo[3,4-b]quinoline

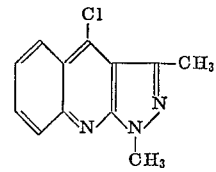

N-(1.3-dimethyl-5-pyrazoyl) anthranilic acid (217 g., 1.28 mol.) was slowly added, with stirring, to phosphorous oxychloride (986 g.) which was carefully warmed to initiate the reaction. This mixture was refluxed for 6 hours. The phosphorous oxychloride was evaporated, in vacuo, and the oily residue became solid after several washings with dry ether. This material was filtered, washed with dry ether, and dried at 70° C./6 mm. to a yellow powder which was stored over potassium hydroxide, in vacuo.

EXAMPLE 4

1,3-dimethyl-4-(3'-dimethylaminopropylamino)-
1H-pyrazolo[3,4-b]quinoline

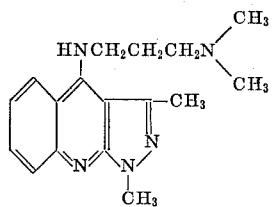

The yellow solid (500 g.) obtained in Example 3, phenol (1880 g.) and 3 - dimethylaminopropylamine (764 g., 7.5 mol.) were combined and stirred for 24 hours at 150° C. Excess phenol and diamine were removed, in vacuo. The resulting brown oil was treated with a 10% sodium hydroxide solution, and a yellow solid precipitated. The solid was distilled in a "Kugelrohr" apparatus at 128° C./5×10⁻⁵ mm. as a yellow oil which slowly crystallized. This material shows only traces of impurities by thin layer chromatography on alumina (solvent, chloroform and a trace of triethylamine; detected by ultraviolet light): Rf product ~0.3.

Yield: 282.1 g., 0.95 mol. (74.2% of theory).

EXAMPLE 5

1,3-dimethyl-4-(3'-dimethylaminopropylamino)-1H-
pyrazolo[3,4-b]quinoline sesquihydrogen sulfate 1,3 - dimethyl - 4 - (3' - dimethylaminopropylamino)-1H - pyrazolo[3,4-b]quinoline (1.0 g., 0.0033 mol.) in ether (75 ml.) was added slowly to a stirred solution of concentrated sulfuric acid (5 ml.) in ether (100 ml.). The suspension was stirred for 1 hour, filtered, and washed with ether. The gummy salt became solid when triturated with dry methanol. This was recrystallized 3 times from water and methanol and found to be a sesquihydrogen sulfate salt by analysis.

*Analysis.*—Calc'd for $C_{17}H_{26}N_5O_6S_{1.5}$ (mol. wt. 444.5) (percent): C, 45.93; H, 5.90; N, 15.76; S, 10.81. Found (percent): C, 45.79; H, 6.15; N, 15.58; S, 10.51.

Yield (1 recrystallization): 0.49 g., 0.0011 mol. (33.8% of theory), M.P. 265–276° C. (decomposes), soluble in water.

EXAMPLE 6

1,3-dimethyl-4-(3'-dimethylaminopropylamino)-1H-
pyrazolo[3,4-b]quinoline trihydrogen phosphate 1,3 - dimethyl - 4 - (3' - dimethylaminopropylamino)-1H - pyrazolo[3,4-b]quinoline (1.0 g., 0.0033 mol.) in ether (75 ml.) was added slowly to a stirred solution of 85% phosphoric acid (5 ml.) in ether (100 ml.). The suspension was stirred for 1 hour, filtered and washed with ether. This was recrystallized 3 times from water and found to be the trihydrogen phosphate salt by analysis.

*Analysis.*—Calc'd for $C_{17}H_{32}N_5O_{12}P_3$ (mol. wt. 591.4) (percent): C, 34.53; H, 5.46; N, 11.85. Found (percent): C, 34.34; H, 5.54; N, 11.86.

Yield (1 recrystallization): 1.44 g., 0.0024 mol. (74.6% of theory) M.P. 211–212° C.

EXAMPLE 7

When in the procedure of Example 4, 3-dimethylaminopropylamine is replaced by an equal molar amount of 3-diethylaminopropylamine,
3-dipropylaminopropylamine,
3-dibutylaminopropylamine,
3-diisopropylaminopropylamine,
3-(N-methyl-N-ethylamino)propylamine,
3-(N-methyl-N-propylamino)propylamine,
3-(N-methyl-N-isopropylamino)propylamine,
3-(N-ethyl-N-propylamino)propylamine and
3-dihexylaminopropylamine there are obtained 1,3-dimethyl-4-(3'-diethylaminopropylamino)-1H-pyrazolo[3,4-b]quinoline,
1,3-dimethyl-4-(3'-dipropylaminopropylamino)-1H-pyrazolo[3,4-b]quinoline,
1,3-dimethyl-4-(3'-dibutylaminopropylamino)-1H-pyrazolo[3,4-b]quinoline,
1,3-dimethyl-4-(3'-diisopropylaminopropylamino)-1H-pyrazolo[3,4-b]quinoline,
1,3-dimethyl-4-[3'-(N-methyl-N-ethylamino)-propylamino]-1H-pyrazolo[3,4-b]quinoline,
1,3-dimethyl-4-[3'-N-methyl-N-propylamino)-propylamino]-1H-pyrazolo[3,4-b]quinoline,
1,3-dimethyl-4-[3'-(N-methyl-N-isopropylamino)propylamino]-1H-pyrazolo[3,4-b]quinoline,
1,3-dimethyl-4-[3'-(N-ethyl-N-propylamino)propylamino]-1H-pyrazolo[3,4-b]quinoline, and
1,3-dimethyl-4-(3'-dihexylaminopropylamino)-1H-pyrazolo[3,4-b]quinoline, respectively.

While this invention has been described and exemplified in terms of its preferred embodiment, those skilled in the art will appreciate that modifications can be made without departing from the spirit and scope of the invention.

We claim:

1. A compound selected from the group consisting of compounds of the formula

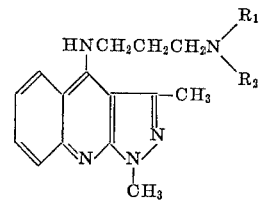

wherein $R^1$ and $R^2$ each represent (lower)alkyl; and the pharmaceutically acceptable nontoxic salts thereof.

2. The compound of claim 1 having the formula

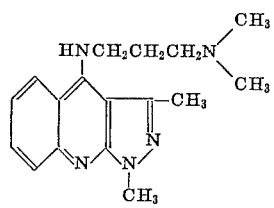

3. A pharmaceutically acceptable nontoxic salt of the compound of claim 2.

4. A hydrogen sulfate salt of the compound of claim 2.

5. A hydrogen phosphate salt of the compound of claim 2.

6. The compound of claim 1 having the formula

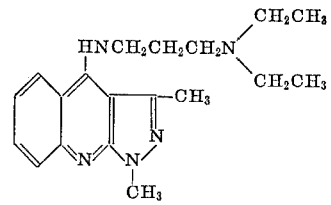

7. The compound of claim 1 having the formula

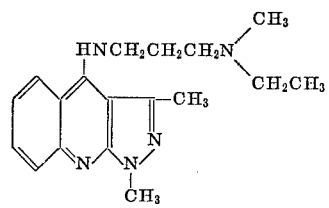

8. The compound of claim 1 having the formula
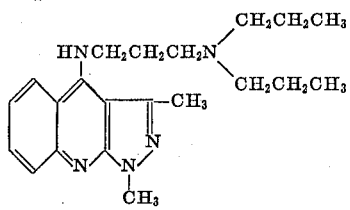
9. The compound of claim 1 having the formula
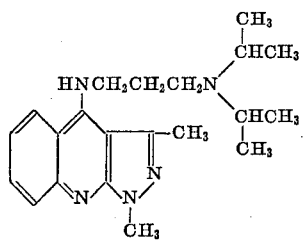
References Cited
UNITED STATES PATENTS
3,234,142  2/1966  Wolfnum ......... 260—288X
FOREIGN PATENTS
1,022,593  1/1958  Germany .......... 260—288
1,152,421  8/1963  Germany .......... 260—288
1,186,867  2/1965  Germany .......... 260—288
1,445,719  1/1969  Germany .......... 260—288
DONALD G. DAUS, Primary Examiner
U.S. Cl. X.R.
260—244, 288, 310; 424—258

UNITED STATES PATENT OFFICE
CERTIFICATE OF CORRECTION

Patent No. 3,600,393  Dated August 17, 1971

Inventor(s) Rolf Ernst Graeve, Joseph Robert Pociask and Robert George Stein It is certified that error appears in the above-identified patent and that said Letters Patent are hereby corrected as shown below:

In Claim 6, please change the formula to read:

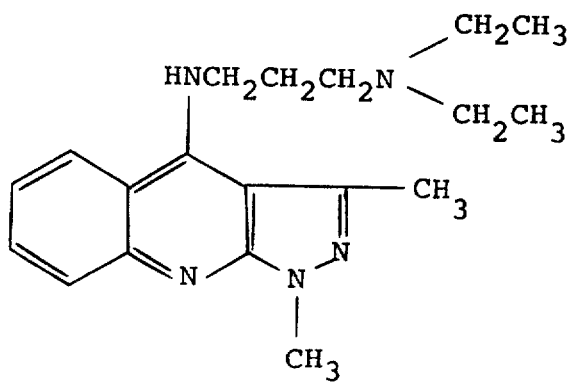

Signed and sealed this 11th day of January 1972.

(SEAL)
Attest:

EDWARD M. FLETCHER, JR.
Attesting Officer

ROBERT GOTTSCHALK
Acting Commissioner of Patents